3,200,128
5-CYCLO-UNSATURATE-3-TRIFLUOROMETHYL-
PYRAZOLES
Hans A. Wagner, Skokie, Ill., assignor to G. D. Searle &
Co., Chicago, Ill., a corporation of Delaware
No Drawing. Filed June 6, 1962, Ser. No. 200,318
5 Claims. (Cl. 260—296)

This invention relates to 5-cyclounsaturate-3-trifluoromethylpyrazoles, intermediates thereto, and processes for the preparation thereof. More particularly, this invention provides novel, biologically useful pyrazoles of the formula

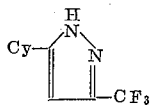

wherein Cy represents a cyclounsaturated radical such as phenyl, thienyl, benzo[b]thienyl, 1,1-dioxobenzo[b]thienyl, and pyridyl. The thienyl radical, and preferably also the benzo[b]thienyl and 1,1-dioxobenzo[b]thienyl radicals contemplated, attaches via the carbon in either the 2-position or the 3-position thereof, whereas the pyridyl radical attaches via any one of carbons 2, 3, or 4 therein.

The pyrazoles of this invention, and likewise the intermediates thereto herein disclosed, are useful because of their valuable pharmacological properties. Thus, for example, they are antibiotics variously effective against bacteria such as *Escherichia coli* and *Diplococcus pneumoniae*, fungi such as *Trichophyton mentagrophytes* and *Candida albicans*, algae such as *Chlorella vulgaris*, and cotyledenous seed germination. Further, especially 1-(4-pyridyl)-3-trifluoromethylpyrazole, the product of Example 6B hereinafter, is adapted to counteract the formation of edema associated with the inflammatory response to tissue injury.

Preparation of the subject compounds proceeds by contacting a ketone of the formula

with ethyl trifluoroacetate in etheral medium under the influenec of an alkaline catalyst such as sodium methoxide to produce the intermediate dione

which, upon heating with hydrazine hydrate in acid alcoholic medium, is cyclized to the pyrazole. As an exception the foregoing procedure, 5-(1,1-dioxo-3-benzo[b]thienyl)-3-trifluoromethylpyrazole is prepared by peracetic acid oxidation, in acetic acid medium, of 5-(3-benzo[b]thienyl)-3-trifluoromethylpyrazole.

The following examples describe in detail compounds illustrative of the present invention and methods which have been devised for their preparation. However, the invention is not to be construed as limited thereby, either in spirit or in scope, since it well be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

*Example 1*

5-*phenyl-3-trifluoromethylpyrazole.*—A solution of 108 parts of 4-trifluoro-1-phenyl-1,3,-butanedione, 27 parts of hydazine hydrate, and 15 parts of glacial acetic acid in 100 parts of 95% ethanol is heated at the boiling point under reflux for 5 hours. The solution is then filtered and concentarted by evaporation to ⅓ of its original volume, whereupon sufficient hot water is added to the boiling solution to induce incipient turbidity. The glistening white leaflets which crystallize from the resultant solution as it cools are filtered off, washed with water, and recrystallized from a mixture of methanol and water. The material thus isolated is 5-phenyl-3-trifluoromethylpyrazole melting at approximately 123–124°, the formula of which is

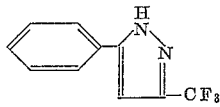

EXAMPLE 2

A. *1-(3-benzo[b]thienyl) - 4 - trifluoro - 1,3 - butanedione.*—To a suspension of 18 parts of sodium methoxide in 300 parts of ether is added 42 parts of ethyl trifluoroacetate, followed by a solution of 53 parts of 3-acetylthianaphthene in 250 parts of ether. The resultant mixture is stirred at 25° overnight, whereupon 400 parts of water is mixed in and the ethereal phase then separated and discarded. The aqueous phase is washed with ether and then acidified with glacial acetic acid. The precipitate thrown down is filtered off and recrystallized from pentane to give 1-(3-benzo[b]thienyl)-4-trifluoro-1,3-butanedione melting at approximately 40°.

B. *5 - (3-benzo[b]thienyl)-3-trifluoromethylpyrazole.*—
A solution of 204 parts of 1-(3-benzo[b]thienyl)-4-trifluoro-1,3-butanedione, 42 parts of hydrazine hydrate, and 45 parts of glacial acetic acid in 150 parts of 95% ethanol is heated at the boiling point under reflux for 5 hours. The solution is thereupon filtered; and the filtrate is concentrated to ⅓ of its original volume by evaporation, whereupon sufficient hot water is added to the concentrate at its boiling point to induce incipient turbidity. From the resultant solution, on cooling, there precipitates 5-(3-benzo[b]thienyl)-3-trifluoromethylpyrazole which, filtered off and recrystallized from methanol, melts at approximately 133°. The product has the formula

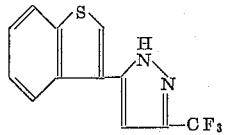

EXAMPLE 3

5-*(1,1-dioxo-3-benzo[b]thienyl) - 3 - trifluoromethylpyrazole.*—To a solution of 8 parts of 5-(3-benzo[b]thienyl)-3-trifluoromethylpyrazole in 45 parts of glacial acetic acid is slowly added, with agitation and at temperatures no higher than 60°, 12 parts of a 40% solution of peracetic acid in glacial acetic acid. The resultant solution is allowed to stand at room temperatures overnight, then poured into 400 parts of water. The precipitate thrown down is filtered off; consecutively washed with water, aqueous 5% sodium bicarbonate, and water; and recrystallized from methanol to afford 5-(1,1-dioxo-3-benzo[b]thienyl)-3-trifluoromethylpyrazole melting at approximately 195°. The product has the formula

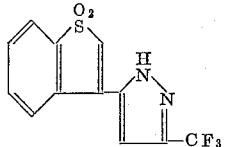

EXAMPLE 4

A. *4 - trifluoro-1-(2-pyridyl)-1,3-butanedione.*—To a suspension of 18 parts of sodium methoxide in 300 parts of ether is added 42 parts of ethyl trifluoroacetate, followed by a solution of 36 parts of 2-acetylpyridine in 250 parts of ether. The resultant mixture is stirred at 25° overnight, whereupon 400 parts of water is mixed in and the ethereal phase then separated and discarded. The aqueous phase is washed with ether and then acidified with glacial acetic acid. The oil which precipitates is extracted with ether.. The ether extract is washed with water and stripped of solvent by distillation. The residue is 4-trifluoro-1-(2-pyridyl)-1,3-butanedione, the melting point of which is below 25°.

B. *5 - (2-pyridyl)-3-trifluoromethylpyrazole.*—A solution of 25 parts of 4-trifluoro-1-(2-pyridyl)-1,3-butanedione, 65 parts of hydrazine hydrate, and 3 parts of glacial acetic acid in 180 parts of 95% ethanol is heated at the boiling point under reflux overnight. The solution is then filtered; and the filtrate is concentrated to ⅓ of its original volume by evaporation, whereupon sufficient hot water is added to the boiling concentrate to induce incipient turbidity. From the solution thus obtained, on cooling, there precipitates 5-(2-pyridyl)-3-trifluoromethypyrazole which, recrystallized from methanol, melts at approximately 137–138°. The product has the formula

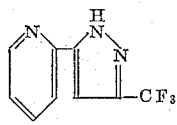

EXAMPLE 5

A. *4 - trifluoro-1-(3-pyridyl)-1,3-butanedione*—To a suspension of 18 parts of sodium methoxide in 300 parts of ether is added 22 parts of ethyl trifluoroacetate, followed by a soultion of 36 parts of 3-acetylpyridine in 250 parts of ether. The resultant mixture is stirred at 25° overnight, whereupon 400 parts of water is mixed in and the ethereal phase then separated and discarded. The aqueous phase is washed with ether and acidified with glacial acetic acid. The precipitate thrown down is filtered off and recrystallized from methanol to give 4-trifluoro-1-(3-pyridyl)-1,3-butanedione melting at approximately 177°.

B. *5-(3-pyridyl)-3-trifluoromethylpyrazole* — A solution of 21 parts of 4-trifluoro-1-(3-pyridyl)-1,3-butanedione, 6 parts of hydrazine hydrate, and 6 parts of glacial acetic acid in 150 parts of 95% ethanol is heated at the boiling point under reflux for 5 hours, whereupon the solution is filtered and the filtrate concentrated to ⅓ its original volume by distillation. Addition to the boiling concentrate of sufficient hot water to induce incipient turbidity, followed by chilling, causes precipitation of 5-(3-pyridyl)-3-trifluoromethylpyrazole which, recrystallized from a mixture of methanol and water, melts at approximately 148–149°. The product has the formula

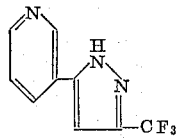

EXAMPLE 6

A. *4-trifluoro-1-(4-pyridyl)-1,3-butanedione* — To a suspension of 18 parts of sodium methoxide in 300 parts of ether is added 42 parts of ethyl trifluoroacetate, followed by a solution of 36 parts of 4-acetylpyridine in 250 parts of ether. The resultant mixture is stirred at 25° overnight, whereupon 400 parts of water is mixed in and the ethereal phase then discarded. The aqueous phase is washed with ether and then acidified with glacial acetic acid. The precipitate thrown down is filtered off and recrystallized from dichloromethane to give 4-trifluoro-1-(4-pyridyl)-1,3-butanedione melting at approximately 180°.

B. *5-(4-pyridyl)-3-trifluoromethylpyrazole* — Substitution of of 21 parts of 4-trifluoro-1-(4-pyridyl)-1,3-butanedione for the 4-trifluoro-1-(3-pyridyl)-1,3-butanedione called for in Example 5B affords, by the procedure there detailed, 5-(4-pyridyl)-3-trifluoromethylpyrazole melting at approximately 190°. The product has the formula

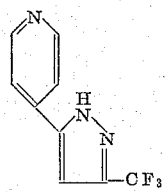

What is claimed is:

1. A compound of the formula

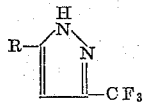

wherein R represents a member of the class consisting of radicals having the formulas

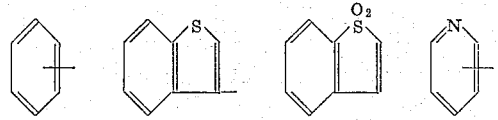

2. 5-phenyl-3-trifluoromethylpyrazole.
3. 5-(3-benzo[b]thienyl)-3-trifluoromethylpyrazole.
4. A compound of the formula

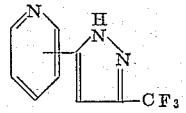

5. 5-(2-pyridyl)-3-trifluoromethylpyrazole.

References Cited by the Examiner

UNITED STATES PATENTS

| | | | |
|---|---|---|---|
| 2,579,419 | 12/51 | Clifford | 260—297 |
| 2,620,344 | 12/52 | Emerson | 260—330.5 |
| 2,634,201 | 4/53 | Mowry et al. | 260—330.5 |
| 2,655,506 | 10/53 | Jones | 260—310 |
| 2,673,856 | 3/54 | Emerson | 260—330.5 |
| 2,681,915 | 6/54 | Gysin | 260—310 |
| 2,723,191 | 11/55 | Schlesinger et al. | 260—330.5 |

OTHER REFERENCES

Fabbrini: Chemical Abstracts, vol. 49, pages 14762–3 (1955) Abstract of Il Farmaco, Ed. Sci., vol. 9, pages 603–10 (1954).

Gough et al.: J. Chem. Soc. (London), 1933, pages 350–1.

Jacobs: Elderfield Heterocyclic Compounds, vol. 5, pages 47 and 54, N.Y., Wiley, 1957.

Yale: Journal Medicinal and Pharmaceutical Chemistry, vol. 1, pages 121–33 (1959).

IRVING MARCUS, *Primary Examiner.*

NICHOLAS S. RIZZO, WALTER A. MODANCE, *Examiners.*